United States Patent Office 3,471,483
Patented Oct. 7, 1969

3,471,483
1 - SUBSTITUTED - 2,3,3a - 4 - TETRAHYDRO - 1H-PYRROLO[2,1 - c][1,2,4]BENZOTHIADIAZINE, 5,5-DIOXIDE
Stanley C. Bell, Narberth, Pa., assignor to American Home Products Corporation, New York, N.Y., a corporation of Delaware
No Drawing. Filed Nov. 9, 1967, Ser. No. 681,905
Int. Cl. C07d 93/92
U.S. Cl. 260—243                4 Claims

ABSTRACT OF THE DISCLOSURE

This invention concerns 1-imino-2,3,3a,4-tetrahydro-1H - pyrrolo[2,1-c][1,2,4] benzothiadiazine, 5,5-dioxides and their corresponding 1-oxo derivatives. The former compounds are useful intermediates in the preparation of the latter which are pharmacologically active as diuretic agents. Further, this invention also concerns a novel process for the preparation of these intermediate compounds.

---

This invention relates to new and novel nitrogen and sulfur containing tricyclic compounds and the process for the preparation thereof. In particular, this invention is concerned with 1-imino-2,3,3a,4-tetrahydro-1H-pyrrolo[2,1-c][1,2,4]benzothiadiazine, 4,4-dioxides which are useful intermediates in the preparation of the corresponding 1 - oxo - 2,3,3a,4-tetrahydro-1H-pyrrolo[2,1-c][1,2,4] benzothiadiazine, 5,5-dioxides which have diuretic activity when tested under standard and acceptable pharmacological procedures. They are, therefore, deemed to possess utility in experimental and comparative pharmacology.

The new and novel compounds encompassed within the purview of the present invention are exemplified by the following formula:

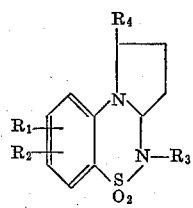

wherein $R_1$ is selected from the group consisting of hydrogen, halogen, lower alkyl and lower alkoxy; $R_2$ is selected from the group consisting of hydrogen and sulfamoyl; $R_3$ is selected from the group consisting of hydrogen and lower alkyl; and $R_4$ is selected from the group consisting of oxo and imino. The terms "lower alkyl" and "lower alkoxy" as employed herein are meant to include both branched and straight chain moieties containing from about one to about eight carbon atoms. Typical examples of these compounds are: 8-chloro-1-imino-2,3,3a,4-tetrahydro - 1H - pyrrolo[2,1-c][1,2,4]benzothiadiazine-7-sulfonamide, 5,5-dioxide; 1-imino-2,3,3a,4-tetrahydro-1H-pyrrolo[2,1 - c][1,2,4]benzothiadiazine, 5,5-dioxide; 8-chloro - 1 - oxo-2,3,3a,4-tetrahydro-1H-pyrrolo[2,1-c][1,2,4]benzothiadiazine-7-sulfonamide, 5,5-dioxide; and 1-oxo - 2,3,3a,4-tetrahydro-1H-pyrrolo[2,1-c][1,2,4]benzothiadiazine, 5,5-dioxide.

The compounds of the present invention may be prepared by the process which is schematically set forth as follows:

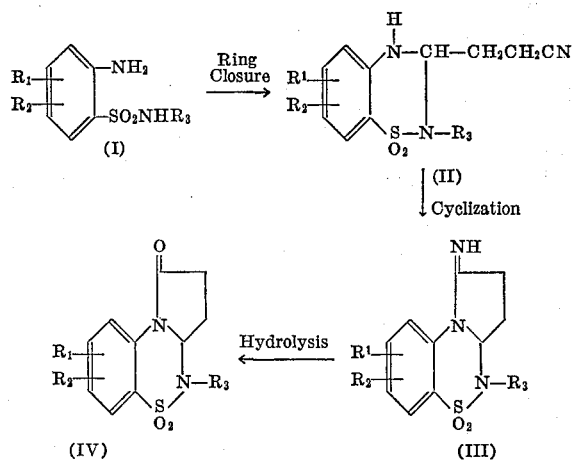

wherein $R_1$, $R_2$ and $R_3$ are defined as above. The ring closure reaction is effected by contacting an appropriate 2-sulfamoyl-aniline (I) with 4,4-dimethoxybutyronitrile in an alkanol, in the presence of a mineral acid, at a temperature range from about 50 C. to about reflux temperatures for a period of about one to about six hours. Preferably this cyclization reaction is conducted in ethanol, in the presence of hydrochloric acid, at about reflux temperatures.

When the ring closure is complete, the resulting 3-(2-cyanoethyl) - 3,4-dihydro-2H-1,2,4-benzothiadiazine, 1,1-dioxide (II) is separated by conventional procedures. For example, the reaction mixture is cooled, diluted with water, filtered and the solid product recrystallized from a suitable solvent, e.g. an alkanol-water mixture.

The new and novel cyclization reaction of the present invention is conducted by contacting an above prepared 3 - (2-cyanoethyl)-3,4-dihydro-2H-1,2,4-benzothiadiazine, 1,1-dioxide (II) with an alkali metal hydroxide in a reaction-inert solvent for a period of about one-half to about three hours. Preferably this reaction is conducted in water, in the presence of sodium hydroxide.

When the cyclization reaction is complete, the resulting 1 - imino-2,3,3a-4-tetrahydro-1H-pyrrolo[2,1 - c] [1,2,4] benzothiadiazine, 5,5-dioxide (III) is separated by conventional procedures. For example, the reaction mixture is acidified, e.g. with an organic such as acetic acid, to precipitate the product, which is then dissolved in a mineral acid and the product (III) reprecipitated by the addition of a weak base, e.g. ammonium hydroxide, sodium bicarbonate or potassium bicarbonate.

The hydrolysis reaction is effected by contacting an appropriate above prepared 1-imino-2,3,3a,4-tetrahydro-1H - pyrrolo[2,1 - c][1,2,4]benzothiadiazine, 5,5-dioxide (III) with a mineral acid at a temperature range from about 60° C. to about 100° C. for a period of about one to about four hours. Preferably this reaction is conducted in hydrochloric acid.

When the hydrolysis reaction is complete, the resulting 1 - oxo-2,3,3a,4-tetrahydro-1H-pyrrolo[2,1-c][1,2,4]benzothiadiazine, 5,5-dioxide (IV) is recovered by standard techniques, for example, the reaction mixture is cooled, filtered and the collect product (IV) washed with an alkanol.

The 2-sulfamoylaniline (I) starting materials employed in the above process are prepared by the procedure disclosed by Novello et al. in the J.O.C. 25, 970 (1960) and Bell et al. in the J.O.C. 29, 3206 (1964). The new and novel 1-imino-2,3,3a,4-tetrahydro - 1H - pyrrolo[2,1-c][1,2,4]benzothiadiazine, 5,5-dioxides (III) of this invention are useful and find utility in the preparation of the new and novel 1-oxo-2,3,3a,4-tetrahydro-1H-pyrrolo[2,1-c][1,2,4]benzothiadiazine, 5,5-dioxides (IV) of the present invention which have been found to possess valuable pharmacological activity. In particular, these latter compounds in standard pharmacological procedures demonstrate diuretic activity and are useful as diuretic agents. Because of this property they are of importance in experimental and comparative pharmacology.

In the pharmacological evaluation of the diuretic compounds of this invention the in vivo effects of these compounds are tested by the procedure described by Lipschitz, W. L., Hadidian, Z., and Kerpczar, A., in the J. Pharmacol. 79:97 (1943). The procedure is described as follows:

Male Sprague-Dawley rats fourteen to seventeen weeks old and weighing between 175 to 200 grams are employed. After fasting the animals for about sixteen hours, the test compound is administered intraperitoneally at a dose of 25 mg./kilo. Each test compound is administered to eight test animals; urea at a dose of 960 mg./kilo. is given as a standard of comparison to another eight test animals; and saline is administered to still another group of eight test animals as controls. The animals are then placed in metabolism cages, two rats per cage, and their urine is collected for five hours. Thereafter, the urine volume and the sodium and potassium concentration thereof are determined. The results are expressed as a ratio of Test/Urea. Test compounds having a ratio greater than 1.00 for volume, and 1.00 for sodium are active diuretic agents.

The 1-oxo-2,3,3a,4-tetrahydro-1H - pyrrolo[2,1-c][1,2,4]benzothiadiazine, 5,5-dioxides (IV) of this invention in the above test procedure are active diuretic agents when administered at an intraperitoneal dose of 25 mg./kilo. Specifically, for example, when 8-chloro-1-oxo-2,3,3a,4 - tetrahydro - 1H - pyrrolo[2,1 - c][1,2,4]benzothiadiazine-7-sulfonamide, 5,5-dioxide is administered at an intraperitoneal dose of 25 mg./kilo. the following ratios are obtained: Sodium—1.46; volume—1.31; potassium—0.98; and sodium-potassium ratio—4.05.

EXAMPLE I

A mixture of 15 g. of 5-chloro-2,4-disulfamoylaniline, 11.0 g. of 4,4-dimethoxybutyronitrile, 200 ml. of ethanol and 100 ml. of 1 N hydrochloric acid is refluxed for two hours. Thereafter, the reaction mixture is cooled, diluted with 300 ml. of water and filtered. The solid (12.8 g.) is then recrystallized from an ethanol-water mixture to afford 6-chloro-3-(2-cyanoethyl)-3,4-dihydro - 2H - 1,2,4-benzothiadiazine-7-sulfonamide, 1,1-dioxide, M.P. 218–220° C.

*Analysis.*—Calcd. for $C_{10}H_{11}ClN_4O_4S_2$: C, 34.24; H, 3.16; N, 15.97; Cl, 10.11; S, 18.28. Found: C, 34.37; H, 2.79; N, 15.75; Cl, 10.10; S, 17.90.

Similarly, 5-bromo-2,4-disulfamoylaniline is contacted with 4,4-dimethoxybutyronitrile in methanol and hydrobromic acid to afford 6-bromo-3-(2-cyanoethyl)-3,4-dihydro-2H-1,2,4-benzothiadiazine - 7 - sulfonamide, 1,1-dioxide.

EXAMPLE II

A mixture of 45 g. of 2,4-disulfamoyl-5-methylaniline, 33.0 g. of 4,4-dimethoxybutyronitrile, 600 ml. of methanol and 300 ml. of 1 N hydrochloric acid is heated to 50° C. for two hours. Thereafter, the reaction mixture is cooled, diluted with 1000 ml. of water and filtered. The collected solid is then recrystallized from a methanol-water mixture to afford 3-(2-cyanoethyl)-3,4-dihydro-6-methyl-2H-1,2,4-benzothiadiazine-7 - sulfonamide, 1,1-dioxide.

In like manner, 3-(2-cyanoethyl)-5-ethyl-3,4-dihydro-2H-1,2,4-benzothiadiazine-7-sulfonamide, 1,1 - dioxide is prepared.

EXAMPLE III

A mixture of 5 g. of 4-methoxy-2-sulfamoylaniline, 3.5 g. of 4,4-dimethoxybutyronitrile, 75 ml. of ethanol and 35 ml. of 1 N hydrochloric acid is refluxed for six hours. Thereafter, the reaction mixture is cooled, diluted with 100 ml. of water and filtered. The solid is then recrystalized from an ethanol-water mixture to afford 3-(2-cyanoethyl)-3,4 - dihydro - 7 - methoxy - 2H - 1,2,4 - benzothiadiazine, 1,1-dioxide.

Similarly, 5-ethoxy-2-sulfamoylaniline is converted to 3 - (2 - cyanoethyl) - 6 - ethoxy - 3,4 - dihydro - 2H - 1,2, 4-benzothiadiazine, 1,1-dioxide.

EXAMPLE IV

A mixture of 30 g. of 2-sulfamoylaniline, 22.0 g. of 4,4-dimethoxybutyronitrile, 400 ml. of methanol and 100 ml. of 2 N hydrochloric acid is refluxed for four hours. Thereafter, the reaction mixture is cooled, diluted with 600 ml. of water and filtered. The solid is then recrystallized from a methanol-water mixture to afford 3-(2-cyanoethyl)-3,4-dihydro - 2H-1,2,4 - benzothiadiazine, 1,1-dioxide.

EXAMPLE V

Repeating the procedure of Examples I–IV, employing an appropriate 2-sulfamoylaniline, 4,4-dimethoxybutyronitrile and a mineral acid, the following compounds are prepared:

3 - (2 - cyanoethyl) - 6 - fluoro - 3,4 - dihydro - 2H - 1,2, 4-benzothiadiazine, 1,1-dioxide;

3 - (2 - cyanoethyl) - 3,4 - dihydro - 7 - propyl - 2H - 1,2, 4-benzothiadiazine, 1,1-dioxide;

3 - (2 - cyanoethyl) - 3,4 - dihydro - 6 - propoxy - 2H - 1, 2,4-benzothiadiazine-7-sulfonamide-1,1-dioxide;

3 - (2 - cyanoethyl) - 3,4 - dihydro - 7 - methyl - 2H - 1,2, 4-benzothiadiazine, 1,1-dioxide; and 3 - (2 - cyanoethyl) - 3,4 - dihydro - 2H - 1,2,4 - benzothiadiazine-6-sulfonamide, 1,1-dioxide.

EXAMPLE VI

To a mixture of 11.0 g. of 6-chloro-3-(2-cyanoethyl)-3,4-dihydro-2H-1,2,4-benzothiadiazine - 7 - sulfonamide, 1,1-dioxide, as prepared in Example I, in 400 ml. of water, there is added 40 ml. of 4 N sodium hydroxide. The reaction mixture is then stirred for one hour and acidified with acetic acid. The product (9.0 g.) M.P. 225–226° C. is purified by dissolving it in dilute hydrochloric acid, removing the impurities by filtration and then adding ammonium hydroxide to precipitate the 8-chloro-1-imino-2,3,3a,4 - tetrahydro - 1H - pyrrolo[2,1-c][1,2,4]benzothiadiazine-7-sulfonamide, 5,5-dioxide, M.P. 230–231° C.

*Analysis.*—Calcd. for $C_{10}H_{11}ClN_4O_4S_2$: C, 34.24; H, 3.16; N, 15.97; Cl, 10.11; S, 18.28. Found: C, 34.41; H, 3.32; N, 15.47; Cl, 10.1; S, 17.8.

In like manner, 6-bromo-3-(2-cyanoethyl)-3,4-dihydro-2H-1,2,4-benzothiadiazine - 7 - sulfonamide, 1,1-dioxide is cyclized to form 8-bromo-1-imino - 2,3,3a,4 - tetrahydro-1H - pyrrolo[2,1-c][1,2,4]benzothiadiazine - 7 - sulfonamide, 5,5-dioxide.

EXAMPLE VII

To a mixture of 5.5 g. of 3-(2-cyanoethyl)-3,4-dihydro - 6 - methyl-2H-1,2,4-benzothiadiazine-7-sulfonamide, 1,1-dioxide, as prepared in Example II, in 200 ml. of ethanol, there is added 20 ml. of 4 N potassium hydroxide. The reaction mixture is then stirred for two hours and acidified with citric acid. The product is dissolved in dilute hydrochloric acid, the impurities removed by filtration and then precipitated by adding ammonium hydroxide to afford 1 - imino - 8-methyl-2,3,3a,4-tetrahydro-1H-pyrrolo[2,1-c][1,2,4]benzothiadiazine - 7 - sulfonamide, 5,5-dioxide.

Similarly, 3 - (2 - cyanoethyl) - 5 - ethyl - 3,4 - dihydro-2H-1,2,4-benzothiadiazine-7-sulfonamide, 1,1-dioxide is converted to 9 - ethyl - 1 - imino-2,3,3a,4-tetrahydro-1H - pyrrolo[2,1-c][1,2,4]benzothiadiazine - 7 - sulfonamide, 5,5-dioxide.

EXAMPLE VIII

To a mixture of 22.0 g. of 3-(2-cyanoethyl)-3,4-dihydro - 7 - methoxy - 2H - 1,2,4 - benzothiadiazine - 1,1-dioxide, as prepared in Example III, in 800 ml. of dimethoxyethane, there is added 60 ml. of 6 N sodium hydroxide. The reaction mixture is then stirred for three hours and then acidified with acetic acid. The product is purified by dissolving it in dilute hydrochloric acid, removing the impurities by filtration and then adding ammonium hydroxide to precipitate the 1-imino-7-methoxy-2,3,3a,4 - tetrahydro - 1H - pyrrolo[2,1-c][1,2,4]benzothiadiazine, 5,5-dioxide.

In the same manner, 8-ethoxy-1-imino-2,3,3a,4-tetrahydro-1H-pyrrolo[2,1-c][1,2,4]benzothiadiazine, 5,5 - dioxide is produced.

EXAMPL IX

To a mixture of 11.0 g. of 3-(2-cyanoethyl)-3,4-dihydro-2H-1,2,4-benzothiadiazine, 1,1-dioxide, as prepared in Example IV, in 400 ml. of water, there is added 80 ml. of 2 N potassium hydroxide. The reaction mixture is then stirred for one hour and then acidified with acetic acid. The product is purified by dissolving it in dilute hydrochloric acid, removing the impurities by filtration and then adding ammonium hydroxide to precipitate the 1 - imino - 2,3,3a,4 - tetrahydro - 1H - pyrrolo[2,1-c][1,2,4]benzothiadiazine, 5,5-dioxide.

EXAMPLE X

Repeating the procedure of Examples VI–IX with the 3 - (2 - cyanoethyl) - 3,4 - dihydro - 2H - 1,2,4 - benzothiadiazine, 1,1-dioxide of Example V, the following compounds are prepared:

8-fluoro-1-imino-2,3,3a,4-tetrahydro-1H-pyrrolo[2,1-c] [1,2,4]benzothiadiazine, 5,5-dioxide;
1-imino-2,3,3a,4-tetrahydro-7-propyl-1H-pyrrolo[2,1-c] [1,2,4]benzothiadiazine, 5,5-dioxide;
1-imino-2,3,3a,4-tetrahydro-8-propoxy-1H-pyrrolo[2,1-c] [1,2,4]benzothiadiazine-7-sulfonamide, 5,5-dioxide;
1-imino-2,3,3a,4-tetrahydro-1H-pyrrolo[2,1-c][1,2,4] benzothiadiazine, 5,5-dioxide; and
1-imino-2,3,3a,4-tetrahydro-1H-pyrrolo[2,1-c][1,2,4] benzothiadiazine-8-sulfonamide, 5,5-dioxide.

EXAMPLE XI

A solution of 3.0 g. of 8-chloro-1-imino-2,3,3a,4-tetrahydro - 1H - pyrrolo[2,1-c][1,2,4]benzothiadiazine - 7- sulfonamide, 5,5-dioxide, as prepared in Example VI, in 100 ml. of 1 N hydrochloric acid is heated at 100° C. for one hour. The reaction mixture is then cooled, the product collected and washed with ethanol to afford 2.4 g. of 8 - chloro - 1 - oxo-2,3,3a,4-tetrahydro-1H-pyrrolo[2,1-c][1,2,4]benzothiadiazine - 7 - sulfonamide, 5,5-dioxide, M.P. 287–288° C. (dec.)

*Analysis.*—Calcd. for $C_{10}H_{10}ClN_3O_5S_2$: C, 34.14; H, 2.87; N, 11.94; Cl, 10.08; S, 18.23. Found: C, 34.30; H, 3.13; N, 12.49; Cl, 10.0; S, 17.7.

In like manner, 8-bromo-1-imino-2,3,3a,4-tetrahydro-1H-pyrrolo[2,1-c][1,2,4]benzothiadiazine - 7 - sulfonamide, 5,5-dioxide is converted to 8-bromo-1-oxo-2,3,3a,4-tetrahydro - 1H - pyrrolo[2,1-c][1,2,4]benzothiadiazine-7-sulfonamide, 5,5-dioxide.

EXAMPLE XII

A solution of 1.5 g. of 1-imino-8-methyl-2,3,3a,4-tetrahydro - 1H - pyrrolo[2,1-c][1,2,4]benzothiadiazine - 7-sulfonamide, 5,5-dioxide, as prepared in Example VII, in 50 ml. of 1 N hydrochloric acid is heated at 60° C. for four hours. The reaction mixture is then cooled, the product collected and washed with methanol to afford 8-methyl - 1 - oxo-2,3,3a,4-tetrahydro-1H-pyrrolo[2,1-c][1,2,4] benzothiadiazine-7-sulfonamide, 5,5-dioxide.

Similarly, 9 - ethyl - 1 - oxo - 2,3,3a,4 - tetrahydro-1H - pyrrolo[2,1,c][1,2,4]benzothiadiazine - 7 - sulfonamide, 5,5-dioxide is prepared.

EXAMPLE XIII

A solution of 6.0 g. of 1-imino-7-methoxy-2,3,3a,4-tetrahydro - 1H - pyrrolo[2,1-c][1,2,4]benzothiadiazine, 5,5-dioxide, as prepared in Example VIII, in 200 ml. of 1 N hydrochloric acid is heated at 100° C. for one hour. The reaction mixture is then cooled, the product collected and washed with ethanol to afford 1-oxo-7-methoxy-2,3,3a,4 - tetrahydro - 1H - pyrrolo[2,1-c][1,2,4]benzothiadiazine, 5,5-dioxide.

In the same manner, 8-ethoxy-1-oxo-2,3,3a,4-tetrahydro - 1H - pyrrolo[2,1-c][1,2,4]benzothiadiazine, 5,5-dioxide is prepared.

EXAMPLE XIV

A solution of 3.0 g. of 1-imino-2,3,3a-4-tetrahydro-1H-pyrrolo[2,1-c][1,2,4]benzothiadiazine, 5,5-dioxide, as prepared in Example IX, in 100 ml. of 1 N hydrochloric acid is heated on a steam bath for one hour. The reaction mixture is then cooled, the product collected and washed with ethanol to afford 1-oxo-2,3,3a,4-tetrahydro-1H-pyrrolo[2,1-c][1,2,4]benzothiadiazine, 5,5-dioxide.

EXAMPLE XV

When the procedure of Examples XI–XIV is repeated on the 1-imino-2,3,3a,4-tetrahydro-1H-pyrrolo[2,1-c][1, 2,4]benzothiadiazine, 5,5-dioxides of Example X the following products are obtained:

8-fluoro-1-oxo-2,3,3a,4-tetrahydro-1H-pyrrolo[2,1-c] [1,2,4]benzothiadiazine, 5,5-dioxide;
1-oxo-2,3,3a,4-tetrahydro-7-propyl-1H-pyrrolo[2,1-c] [1,2,4]benzothiadiazine, 5,5-dioxide;
1-oxo-2,3,3a,4-tetrahydro-8-propoxy-1H-pyrrolo[2,1-c] [1,2,4]benzothiadiazine-7-sulfonamide, 5,5-dioxide;
1-oxo-2,3,3a,4-tetrahydro-1H-pyrrolo[2,1-c][1,2,4] benzothiadiazine, 5,5-dioxide; and
1-oxo-2,3,3a,4-tetrahydro-1H-pyrrolo[2,1-c][1,2,4] benzothiadiazine-8-sulfonamide, 5,5-dioxide.

What is claimed is:
1. A compound selected from the group consisting of those having the formula:

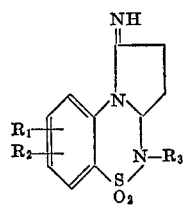

wherein $R_1$ is selected from the group consisting of hydrogen, halogen, lower alkyl and lower alkoxy; $R_2$ is selected from the group consisting of hydrogen and sulfamoyl; and R₃ is selected from the group consisting of hydrogen and lower alkyl.

2. A compound as described in claim 1 which is: 8-chloro - 1 - imino - 2,3,3a,4-tetrahydro-1H-pyrrolo[2,1-c][1,2,4]benzothiadiazine-7-sulfonamide, 5,5-dioxide.

3. A process for the preparation of compounds having the formula:

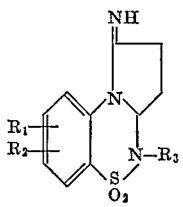

wherein R₁ is selected from the group consisting of hydrogen, halogen, lower alkyl and lower alkoxy; R₂ is selected from the group consisting of hydrogen and sulfamoyl; and R₃ is selected from the group consisting of hydrogen and lower alkyl, which comprises contacting a compound of the formula:

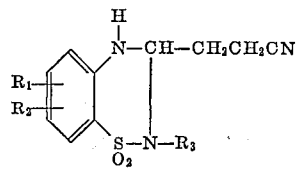

wherein R₁, R₂ and R₃ are defined as above, with an alkali metal hydroxide in a reaction-inert solvent for a period of about one-half to about three hours.

4. A process as described in claim 3 wherein the alkali metal hydroxide is sodium hydroxide and the reaction-inert solvent is water.

References Cited
UNITED STATES PATENTS
3,311,620  3/1967  Bell et al.

NICHOLAS S. RIZZO, Primary Examiner

U.S. Cl. X.R.
424—246